United States Patent
Wu et al.

(10) Patent No.: US 9,525,605 B2
(45) Date of Patent: Dec. 20, 2016

(54) METHOD OF AND SYSTEM FOR COLLECTING NETWORK DATA

(71) Applicants: PEKING UNIVERSITY FOUNDER GROUP CO., LTD., Beijing (CN); PEKING UNIVERSITY, Beijing (CN); BEIJING FOUNDER ELECTRONICS CO., LTD., Beijing (CN)

(72) Inventors: Xinli Wu, Beijing (CN); Jianwu Yang, Beijing (CN)

(73) Assignees: PEKING UNIVERSITY FOUNDER GROUP CO., LTD., Beijing (CN); PEKING UNIVERSITY, Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 309 days.

(21) Appl. No.: 14/123,036

(22) PCT Filed: Dec. 13, 2012

(86) PCT No.: PCT/CN2012/086584
§ 371 (c)(1),
(2) Date: Nov. 27, 2013

(87) PCT Pub. No.: WO2013/087012
PCT Pub. Date: Jun. 20, 2013

(65) Prior Publication Data
US 2014/0289394 A1    Sep. 25, 2014

(30) Foreign Application Priority Data
Dec. 13, 2011 (CN) .......................... 2011 1 0415356

(51) Int. Cl.
*G06F 15/173* (2006.01)
*H04L 12/26* (2006.01)
*G06F 17/30* (2006.01)

(52) U.S. Cl.
CPC ......... *H04L 43/06* (2013.01); *G06F 17/30864* (2013.01)

(58) Field of Classification Search
CPC .......................... H04L 43/06; G06F 17/30864
(Continued)

(56) References Cited

U.S. PATENT DOCUMENTS 6,665,665 B1 * 12/2003 Ponte ................. G06F 17/30902
6,718,363 B1 *  4/2004 Ponte ................. G06F 17/30861
                                                              370/254
(Continued)

FOREIGN PATENT DOCUMENTS

CN       101094135 A      12/2007
CN       101136026 A       3/2008
(Continued)

OTHER PUBLICATIONS

International Search Report dated Mar. 21, 2013 from International Patent Application No. PCT/CN2012/086584 filed Dec. 13, 2012.

*Primary Examiner* — Anthony Mejia
(74) *Attorney, Agent, or Firm* — Workman Nydegger (57) ABSTRACT

The invention discloses a method of collecting network data. This method is applicable to collection of data of network documents, published on a website, related respectively to M subjects, wherein M is a positive integer, the method including: configuring webpage link addresses, of network data to be collected, into queues of corresponding types according to types corresponding to the webpage link addresses of the network data to be collected, wherein the webpage link addresses of the network data to be collected (Continued)

are link addresses of webpages where the data of the network documents related respectively to the M subjects are located; obtaining webpage source codes corresponding to the webpage link addresses, of the network data to be collected, in the queues of the corresponding types; and extracting the data of the network documents corresponding to URLs corresponding to the webpage source codes according to the URL information and collection depth values of the URLs.

18 Claims, 5 Drawing Sheets

(58) Field of Classification Search
USPC .................................................. 709/224, 223
See application file for complete search history.

(56) References Cited

U.S. PATENT DOCUMENTS

| | | | |
|---|---|---|---|
| 6,757,866 B1 * | 6/2004 | Dey | G06F 17/30864 707/999.003 |
| 6,912,525 B1 * | 6/2005 | Chipalkatti | G06F 17/30675 |
| 7,080,073 B1 * | 7/2006 | Jiang | G06F 17/2229 |
| 7,275,061 B1 * | 9/2007 | Kon | G06F 17/30707 |
| RE42,870 E * | 10/2011 | Seibel | G06F 17/30616 707/769 |
| 8,140,526 B1 * | 3/2012 | Zhang | G06F 17/30687 707/730 |
| 8,229,873 B1 * | 7/2012 | Dolan | G06Q 30/00 706/45 |
| 2001/0051943 A1 * | 12/2001 | Drucker | G06F 17/30699 |
| 2003/0187833 A1 * | 10/2003 | Plu | G06F 17/30014 |
| 2011/0238664 A1 * | 9/2011 | Pedersen | G06F 17/30011 707/737 |
| 2012/0323881 A1 * | 12/2012 | Liu | G06F 17/30864 707/709 |
| 2014/0108445 A1 * | 4/2014 | Oztekin | G06F 17/3097 707/767 |

FOREIGN PATENT DOCUMENTS

| | | |
|---|---|---|
| CN | 101593200 A | 12/2009 |
| CN | 102118400 A | 7/2011 |

* cited by examiner

METHOD OF AND SYSTEM FOR COLLECTING NETWORK DATA

This application is a U.S. National Stage of International Application No. PCT/CN2012/086584, filed on Dec. 13, 2012, designating the U.S. and claiming the benefit of Chinese Patent Application No. 201110415356.8, filed with the Chinese Patent Office on Dec. 13, 2011 and entitled "Method of and system for collecting network data", both of which are hereby incorporated by reference in its entirety.

FIELD OF THE INVENTION

The present invention relates to the field of information retrieval and data integration and particularly to a method of and system for collecting network data.

BACKGROUND OF THE INVENTION

Along with emergence and popularization of the Internet, billions of Internet users are provided with various categories of literature data information over the Internet, and in the meantime, a category of network literatures carried over this emerging medium and targeted to the Internet users has come up potentially.

The network literatures refer to recently emerging literature contributions, literature-like texts, and network artworks including some literature components, all of which are presented and propagated over the Internet and embodied by means of hypertext links, multimedia presentation, etc. Particularly the original network contributions are predominant. The network literatures can be divided into three categories, where the first category relates to digital resources resulting from electronic scanning or manual entry of published literature contributions; the second category relates to literature contributions "published" directly over the Internet; and the third category relates to literature contributions created by computers or generated by related computer software onto the Internet, "relay novels" open over the Network and created jointly by several to tens of and even hundreds of Internet users, where the second category is predominant.

Along with development of the network literatures, numerous issues consequentially arise regarding copyright, literature creation contents, etc. Issues regarding how to browse latest contents of the network literatures conveniently, rapidly and centrally and how to retrieve or supervise the network literatures have not been effectively addressed so far due to the absence of a support for network literature related data.

SUMMARY OF THE INVENTION

The invention provides a method of and system for collecting network data, which can enable real-time collection of latest network data.

In an aspect of the invention, there is provided a method of collecting network data, applicable to collection of data of network documents, published on a website, related respectively to M subjects, wherein M is a positive integer, the method including: configuring webpage link addresses, of network data to be collected, into queues of corresponding types according to types corresponding to the webpage link addresses of the network data to be collected, wherein the webpage link addresses of the network data to be collected are link addresses of webpages where the data of the network documents related respectively to the M subjects are located; obtaining webpage source codes corresponding to the webpage link addresses, of the network data to be collected, in the queues of the corresponding types; and extracting the data of the network documents corresponding to Uniform Resource Locators (URLs) corresponding to the webpage source codes according to the URL information and collection depth values of the URLs.

Preferably refresh intervals are preset according to the frequencies at which the network documents, published on the website, related respectively to the M subjects are updated; and the webpage link addresses of the network data to be collected are refreshed at the refresh intervals.

Preferably each of the M subjects relates to a network literature, and the method further includes: configuring the collection depth value of the URL according to structure of the network literature as:

$$N_{Deep} = \begin{cases} \text{A first threshold representing a contribution in the structure} \\ \quad \text{of "Name > Volume > Chapter > Contents"} \\ \text{A second threshold representing a contribution in the structure} \\ \quad \text{of "Name > Chapter > Contents"} \\ \text{A third threshold representing a contribution in the structure} \\ \quad \text{of "Chapter > Contents"} \end{cases}.$$

Preferably the types corresponding to the webpage link addresses of the network data to be collected include a subject name page, a list page and a content page; and the subject name page is configured for extracting a subject name, the list page is configured for extracting a subject chapter/section directory or a subject chapter/section, and the content page is configured for extracting subject contents.

Preferably the configuring the webpage link addresses, of the network data to be collected, into the queues of the corresponding types further includes: allocating a link address of the type of subject name page to a subject name page queue; allocating a link address of the type of list page to a list page queue; and allocating a link address of the type of content page to a content page queue.

Preferably the obtaining the webpage source codes corresponding to the webpage link addresses, of the network data to be collected, in the queues of the corresponding types further includes: obtaining a webpage source code corresponding to the link address of the subject name page from the subject name page queue.

Preferably the extracting the data of the network documents corresponding to the URLs corresponding to the webpage source codes according to the URL information and the collection depth values of the URLs further includes: if the collection depth value is a first threshold, then extracting the name of a subject and a URL corresponding to the name and marking and then adding to the list page queue a collection depth value of the URL corresponding to the name as a second threshold; and if the collection depth value is the second threshold, then extracting the name of the subject and the URL corresponding to the name and marking and then adding to the list page queue the collection depth value of the URL corresponding to the name as a third threshold.

Preferably the obtaining the webpage source codes corresponding to the webpage link addresses, of the network data to be collected, in the queues of the corresponding types further includes: obtaining a webpage source code corresponding to the link address of the list page from the list page queue.

Preferably the extracting the data of the network documents corresponding to the URLs corresponding to the webpage source codes according to the URL information and the collection depth values of the URLs further includes: if the collection depth value is a second threshold, then extracting a chapter/section directory of a subject and a URL corresponding to the chapter/section directory and marking and then adding to the list page queue a collection depth value of the URL corresponding to the chapter/section as a third threshold; and if the collection depth value is the third threshold, then determining whether there is an upper URL for the URL corresponding to the webpage source code: if so, then extracting a chapter/section title of the subject and a URL of a chapter/section corresponding to the chapter/section title, and adding the URL of the chapter/section to the content page queue; or if not, then extracting the name of the subject, the chapter/section title of the subject and the URL of the chapter/section corresponding to the chapter/section title, and adding the URL of the chapter/section to the content page queue.

Preferably the obtaining the webpage source codes corresponding to the webpage link addresses, of the network data to be collected, in the queues of the corresponding types further includes: obtaining a webpage source code corresponding to the link address of the content page from the content page queue.

Preferably the extracting the data of the network documents corresponding to the URLs corresponding to the webpage source codes according to the URL information and the collection depth values of the URLs further includes: extracting a chapter/section title of a subject and text contents of a chapter/section from the webpage source code, and extracting the chapter/section ID of the chapter/section corresponding to the chapter/section title from the URL corresponding to the webpage source code.

Preferably it is determined whether the text contents of the chapter/section are page: if so, then a link address of a next page is extracted and also the page number of a current page and the page number of the next page are marked, and the page number of the next page is sent to the content page queue waiting for collection.

Preferably the contents of the subsequent page are stored with a link to the first page of the text contents of the chapter/section being a unique key, and an end flag is given upon collection of the last page.

Preferably the extracted text contents of all the subsequent pages are merged together and output in connection with the chapter/section title.

In another aspect of the invention, there is provided a system for collecting data, applicable to collection of data of network documents, published on a website, related respectively to M subjects, wherein M is a positive integer, the system including: a configuring module configured to configure webpage link addresses, of network data to be collected, into queues of corresponding types according to types corresponding to the webpage link addresses of the network data to be collected, wherein the webpage link addresses of the network data to be collected are link addresses of webpages where the data of the network documents related respectively to the M subjects are located; a webpage obtaining module configured to obtain webpage source codes corresponding to the webpage link addresses, of the network data to be collected, in the queues of the corresponding types; and a data extracting module configured to extract the data of the network documents corresponding to Uniform Resource Locators (URLs) corresponding to the webpage source codes according to the URL information and collection depth values of the URLs.

Preferably the system further includes: a refreshing module configured to preset refresh intervals according to the frequencies at which the network documents, published on the website, related respectively to the M subjects are updated and to refresh the webpage link addresses of the network data to be collected at the refresh intervals.

Preferably the types corresponding to the webpage link addresses of the network data to be collected include a subject name page, a list page and a content page, and the configuring module includes a webpage configuring module configured to configure the subject name page for extracting a subject name, to configure the list page for extracting a subject chapter/section directory or a subject chapter/section, and to configure the content page for extracting subject contents.

Preferably the configuring module further includes a queue configuring module configured to configure the network link addresses of the network data to be collected into the queues of the corresponding types, and the queue allocating module further includes: a first allocating unit configured to allocate a link address of the type of subject name page to a subject name page queue; a second allocating unit configured to allocate a link address of the type of list page to a list page queue; and a third allocating unit configured to allocate a link address of the type of content page to a content page queue.

Advantageous effects of the invention are as follows:

In an embodiment of the invention, a system for collecting network data collects network data, and the system obtains a link address of the network data, configures the type of the link address and puts the link address into a corresponding queue according to the type of the link address; and obtains a source code corresponding to the link address from the queue and extracts information of the network data according to information about a corresponding URL in the source code and a collection depth value of the URL, thereby achieving the technical effect of real-time collection of the network data.

Furthermore the content merging module can be further configured to merge network documents belonging to the same subject to thereby achieve the effect of convenient, rapid and centralized browsing of the network data together with real-time collection thereof

DETAILED DESCRIPTION OF THE EMBODIMENTS

The invention will be described below in details in order to enable those skilled in the art to understand the invention more clearly and fully.

Figure 1:
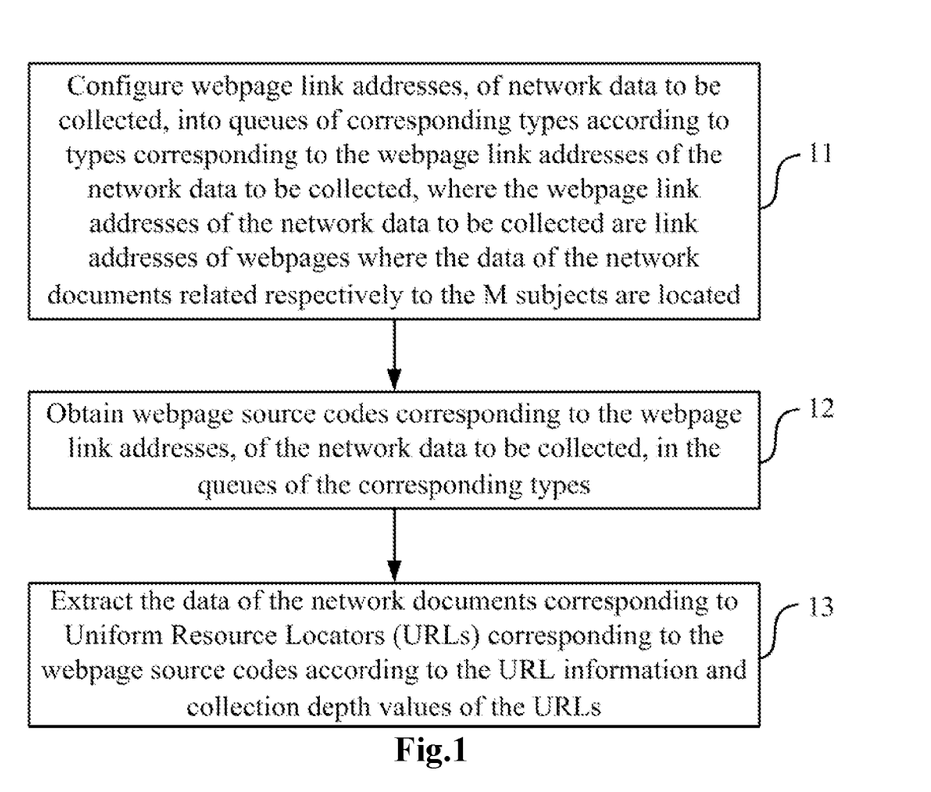
FIG. 1 is a flow chart of a collecting method in an embodiment of the invention.

An embodiment of the invention provides a method of collecting network data, applicable to collection of data of network documents, published on a website, related respectively to M subjects, where M is a positive integer, and reference is made to FIG. 1 which is a flow chart of the collecting method in this embodiment. As illustrated in FIG. 1, the method of collecting network data includes:

Step 11 is to configure webpage link addresses, of network data to be collected, into queues of corresponding types according to types corresponding to the webpage link addresses of the network data to be collected, where the webpage link addresses of the network data to be collected are link addresses of webpages where the data of the network documents related respectively to the M subjects are located;

Step 12 is to obtain webpage source codes corresponding to the webpage link addresses, of the network data to be collected, in the queues of the corresponding types; and Step 13 is to extract the data of the network documents corresponding to Uniform Resource Locators (URLs) corresponding to the webpage source codes according to the URL information and collection depth values of the URLs.

In the step 11, the M subjects published on the website can be M network literature contributions, and for convenient understanding of the invention, the following embodiment will be described taking network literatures as an example, but the invention will not be limited to network literatures. Network literatures are published in a structure different from, for example, network news and other subjects. General network news is published in a single piece, and network literature contributions are typically published on a website in two presentation forms. One of the forms is similar to "Literature Name->Chapter/Section Directory Page->Network Literature Content Page of Specific Chapter/Section" on a novel read website, where there is a concept of "Volume" preceding to "Chapter/Section Directory Page" for some network literatures; and the other form is similar to a content directory webpage of a general news website, where chapters/sections of different literature contributions may be interleaved for presentation together, but chapters/sections in the same contribution may be indicated in the form of "Literature Contribution Name (5)" or like in a title.

Data of network documents of differently structured network literature contributions shall be collected by firstly obtaining link addresses of webpages where the data of the network documents are located. In this embodiment, the data of the network documents generally include the names of network literature contributions to which the network documents belong, the names of volumes and/or chapters/sections in the network literature contributions to which the network documents belong, and text contents of the network documents according to the structures in which the network literature contributions are published on the website. Correspondingly the types corresponding to the link addresses of the webpages where the data of the network documents are located include: subject name pages for extracting the names of the network literature contributions to which the network documents belong; list pages for extracting chapters/sections directory links and chapter links of the network literature contributions, where chapters/sections directories include volume directories and chapter directories; and content pages for extracting subject text contents.

In this embodiment, the link addresses of the webpages where the data of the M network literatures are located are put into different queues according to their types. Specifically the link addresses of the type of subject name page are allocated into a subject name page queue; the link addresses of the type of list page are allocated into a list page queue; and the link addresses of the type of content page are allocated into a content page queue. For example, three network literature contributions are published on a website A respectively as A1, A2 and A3, where A1 is published on the website A in the structure of Literature Name->Volume Directory->Chapter Directory->Network Literature Content Page of Specific Chapter/Section; A2 is published on the website A in the structure of Literature Name->Chapter Directory->Network Literature Content Page of Specific Chapter/Section; and A3 is published on the website A in the structure of Chapter Title->Network Literature Content Page of Specific Chapter/Section, and a chapter title of A3 is the combination of the contribution name and the number of chapters of A3, for example, the chapter title of the first chapter of A3 is A3(1), and the chapter title of the fifth chapter of A3 is A3(5). To start a collecting process on the website A, a link address B1 of a webpage with the name of the contribution A1 is put into the subject name page queue; a link address B2 of a webpage with the name of the contribution A2 is put into the subject name page queue; and the address B3 of a chapter/section link with the contribution A3 is put into the list page queue waiting for collection. Collection starts with the content page queue in which no link address for collection is put.

In a piratical collection process, since the network documents may be updated periodically but not as frequently as network news and forum information, a periodical refresh policy can be adopted, and of course, alternatively an adaptive refresh policy can be adopted, that is, a refresh interval can be adjusted automatically to the frequency at which a different network literature contribution is published on the website itself Upon detection of an arriving refresh interval of some network literature contribution, the webpage link address of the refreshed network data to be collected is put into the queue of the corresponding type thereof Particularly in the step 12 where the webpage source codes corresponding to the webpage link addresses, of the network data to be collected, in the respective queues are obtained, a link address for collection is obtained from the respective queues according to system-preset URL obtaining policies, for example, which can be preset by those skilled in the art in practical operation as needed in time according to an operating condition of the system or conditions of the respective queues, and then the system obtains a webpage source code in an Http request. In this embodiment, to start the three network literature contributions on the website A, for example, the webpage link addresses B1 and B2 of the network data to be collected are extracted from the subject name queue, and the webpage source code corresponding to B1 and the webpage source code corresponding to B2 are extracted respectively according to the system-preset ULR obtaining policy; and the webpage link address B3 of the network data to be collected is extracted from the list page queue, and the webpage source code thereof is extracted according to the system-preset ULR obtaining policy.

In the step 13, the ULR information corresponding to the web source code includes the name of a network literature contribution, chapter/section directory and chapter/section links, and a link to text contents. The collection depth value of the URL is particularly as follows according to structure of the network literature contribution:

$$N_{Deep} = \begin{cases} \text{A first threshold representing a contribution in the structure} \\ \quad \text{of "Name > Volume > Chapter > Contents"} \\ \text{A second threshold representing a contribution in the structure} \\ \quad \text{of "Name > Chapter > Contents"} \\ \text{A third threshold representing a contribution in the structure} \\ \quad \text{of "Chapter > Contents"} \end{cases}$$

In this embodiment, the first threshold is 3, the second threshold is 2, and the third threshold is 1, and of course, those skilled in the art can alternatively represent different thresholds as other numbers or labels, and for a convenient description of the invention, the following description will be given by way of an example in which the first threshold is 3, the second threshold is 2, and the third threshold is 1, and the collection depth values configured for the structures of the network literatures contribution can be understood in connection with A1, A2 and A3 published on the website A. After the link address B1 is obtained from the subject name page queue, the corresponding URL (i.e., URL-A1) obtained according to the source code corresponding to B1, and the A1 is structured in "Literature Name->Volume Directory->Chapter Directory->Network Literature Content Page of Specific Chapter/Section", so the collection depth value of URL-A1 is 3. Alike A2 is structured in "Literature Name->Chapter Directory->Network Literature Content Page of Specific Chapter/Section", and then the collection depth value of the URL (i.e., URL-A2) corresponding to the source code obtained according to B2 is 2; and A3 is structured in "Chapter Title->Network Literature Content Page of Specific Chapter/Section", and then the collection depth value of the URL (i.e., URL-A3) corresponding to the source code obtained according to B3 is 3.

Figure 2:
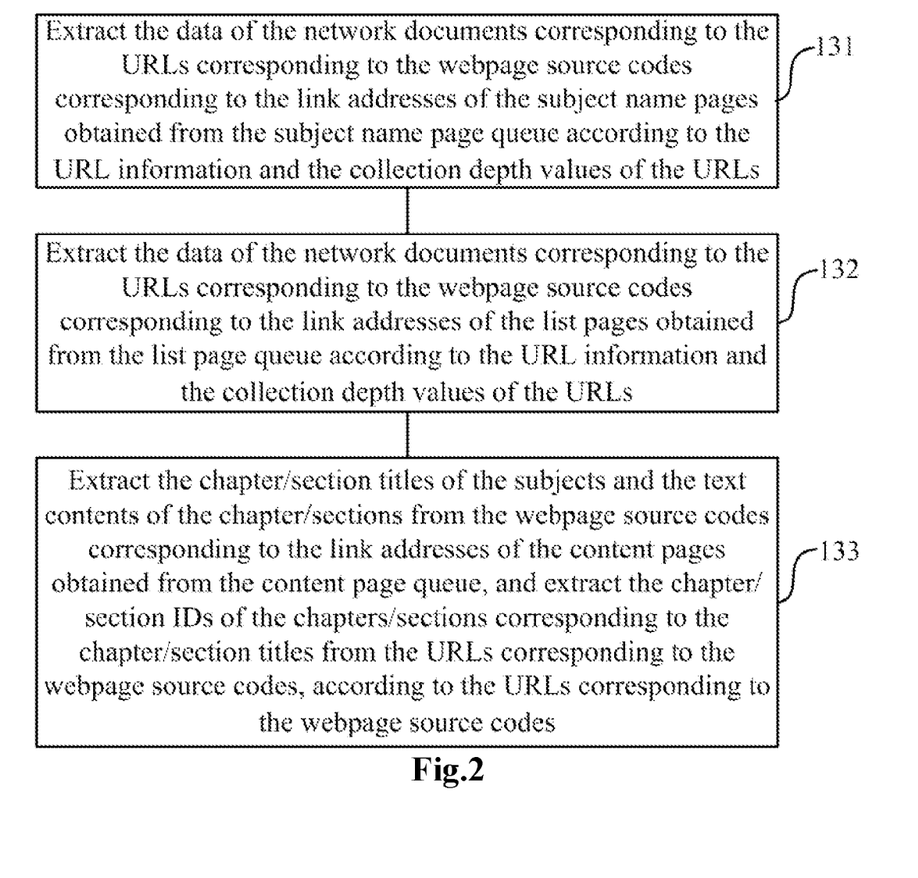
FIG. 2 is a detailed flow chart of the collecting method in FIG. 1 of the invention.

The step 13 particularly includes (referring to FIG. 2):

Step 131 is to extract the data of the network documents corresponding to the URLs corresponding to the webpage source codes corresponding to the link addresses of the subject name pages obtained from the subject name page queue according to the URL information and the collection depth values of the URLs.

Step 132 is to extract the data of the network documents corresponding to the URLs corresponding to the webpage source codes corresponding to the link addresses of the list pages obtained from the list page queue according to the URL information and the collection depth values of the URLs.

Step 133 is to extract the chapter/section titles of the subjects and the text contents of the chapter/sections from the webpage source codes corresponding to the link addresses of the content pages obtained from the content page queue, and to extract the chapter/section IDs of the chapters/sections corresponding to the chapter/section titles from the URLs corresponding to the webpage source codes, according to the URLs corresponding to the webpage source codes.

The foregoing steps 131, 132 and 133 may not necessarily be performed in a specific order, and once there is a link address for collection in the respective queues, collection can be performed with respect to the link address for collection to obtain a webpage source code corresponding to the webpage link address of network data to be collected and to obtain the data of a network document corresponding to a URL corresponding to the webpage source code according to the URL information and a collection depth value of the URL.

In the step 131, the data of the network documents corresponding to the URLs are extracted particularly as follows:

If a collection depth value of a URL is 3, then the name of a subject and a URL corresponding to the name are extracted, and a collection depth value of the URL corresponding to the name is marked as the second threshold and then added to the list page queue; and If a collection depth value of a URL is 2, then the name of a subject and a URL corresponding to the name are extracted, and a collection depth value of the URL corresponding to the name is marked as 1 and then added to the list page queue.

In this embodiment, the link addresses extracted from the subject name page queue are the link address B1 of A1 and the link address B2 of A2. Since the collection depth value of the URL-A1 corresponding to the source code corresponding to B1 is 3, then the subject name of A1 will be extracted and represented as "Name A1", and also a URL corresponding to "Name A1" will be extracted and represented as "URL-A11", and a collection depth value of "URL-A11" is marked as 2 and then added to the list page queue so as to extract other information in the URL-A11 about the contribution A1. For the link address B2, since the collection depth value of the URL-A2 is 2, then the subject name of A2 will be extracted and represented as "Name A2", and also a URL corresponding to "Name A2" will be extracted and represented as "URL-A21", and a collection depth value of "URL-A21" is marked as 1 and then added to the list page queue so as to extract other information in the URL-A21 about the contribution A2.

In the step 132, the data of the network documents corresponding to the URLs are extracted particularly as follows:

If a collection depth value of a URL is 2, then a chapter/section directory of a subject and a URL corresponding to the chapter/section directory are extracted, and a collection depth value of the URL corresponding to the chapter/section directory is marked as 1 and then added to the list page queue; and If a collection depth value of a URL is 1, then it is determined whether there is an upper URL for the URL corresponding to the webpage source code:

If so, then a chapter/section title of the subject and a URL of a chapter/section corresponding to the chapter/section title are extracted, and the URL of the chapter/section is added to the content page queue; or If not, then the name of the subject, the chapter/section title of the subject and the URL of the chapter/section corresponding to the chapter/section title are extracted, and the URL of the chapter/section is added to the content page queue.

In this embodiment, the URL-A11 and the URL-A21 for collection have been stored in the list page queue in the step 131. Moreover collection of the network literature contributions of the website A is started with the link address B3 corresponding to the contribution A3 put into the list page queue.

For the URL-A11 with a collection depth value of 2, a chapter/section directory of A1 is extracted and a URL corresponding to the chapter/section directory is extracted and represented as "URL-A12". A collection depth value of the URL-A12 is marked as 1 and then added to the list page queue.

For the URL-A21 with a collection depth value of 1 and also with an upper URL (and URL-A21), a chapter/section title of A2 is extracted and a URL corresponding to the chapter/section title is extracted and represented as "URL-A22" which is added to the content page queue.

For B3 in the list page queue, since there is a collection depth value of 1 but no upper level URL for the URL-A3 corresponding to the source code corresponding to B3, then the name of A3 is extracted and represented as "Name A3", a chapter/section title is extracted, and also a URL of a chapter/section corresponding to the chapter/section title is extracted and represented as "URL-A31" which is added to the content page queue.

In the step 133, if the text of a chapter is paged, then a link address of a next page needs to be extracted, and also the page number of a current page and the page number of the next page are marked, and the link address of the next page is added to the content page queue waiting for collection.

Moreover the contents of the subsequent page are stored with a link to the first page of the text contents of the chapter/section being a unique key, and an end flag is given upon collection of the last page.

Furthermore the extracted text contents of all the subsequent pages are merged together and entered in connection with the chapter/section title.

Still furthermore the website, the name of the subjects, the chapter/section titles of the subjects, the chapter/sections IDs and the text contents of the chapter/sections are uploaded into a database, where the text contents of the chapter/section can alternatively be stored into a file server in the form of an attachment, and a path to the stored file can be recorded into the database.

In this embodiment, the method of collecting and merging network data can enable network literatures to be presented in the form of a book, and furthermore real-time collection of the data can be performed by refreshing the collected data automatically, so this embodiment can achieve an advantageous effect of real-time, convenient and centralized browsing of the network literature contributions.

Figure 3:
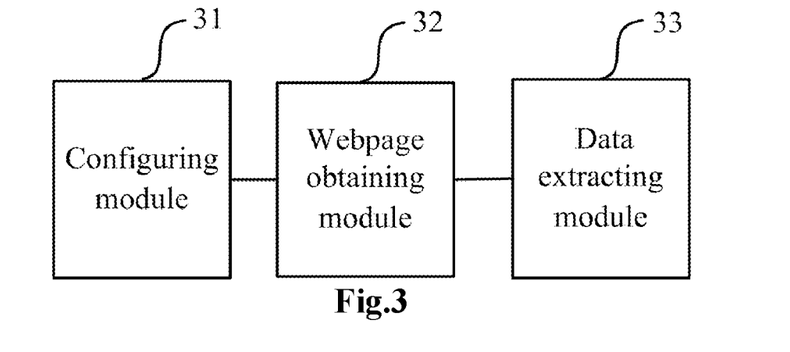
FIG. 3 is an architectural diagram of a collecting system in a first embodiment of the invention.

A first embodiment of the invention provides a system for collecting network data, applicable to collection of data of network documents, published on a website, related respectively to M subjects, where M is a positive integer, and reference is made to FIG. 3 which is an architectural diagram of the collecting system in this embodiment. As illustrated in FIG. 3, the system for collecting data includes a configuring module 31, a webpage obtaining module 32 and a data extracting module 33. The configuring module 31 is configured to configure webpage link addresses, of network data to be collected, into queues of corresponding types according to types corresponding to the webpage link addresses of the network data to be collected, where the webpage link addresses of the network data to be collected are link addresses of webpages where the data of the network documents related respectively to the M subjects are located.

The webpage obtaining module 32 is configured to obtain webpage source codes corresponding to the webpage link addresses, of the network data to be collected, in the queues of the corresponding types. The data extracting module 33 is configured to extract the data of the network documents corresponding to URLs corresponding to the webpage source codes according to the URL information and collection depth values of the URLs.

In this embodiment, the types corresponding to the webpage link addresses of the network data to be collected include a subject name page, a list page and a content page.

Figure 4:
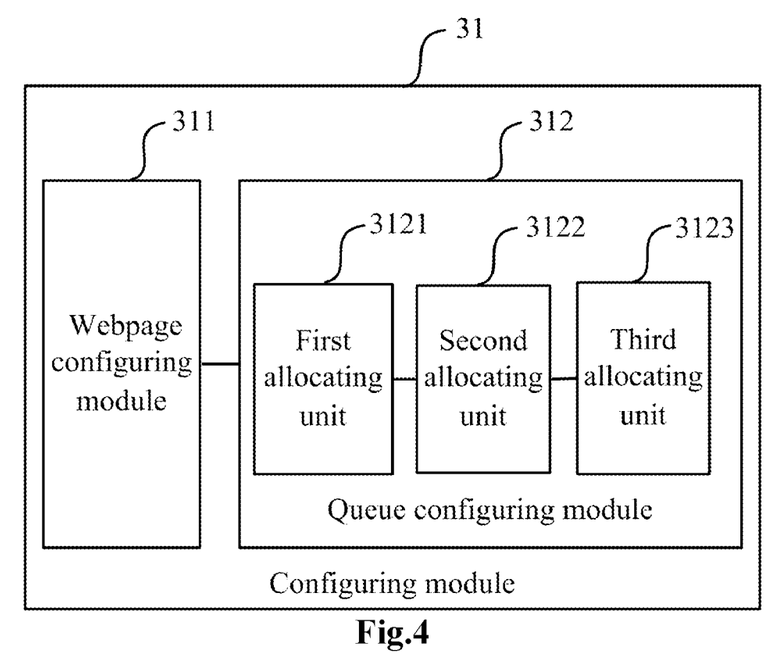
FIG. 4 is an architectural diagram of a configuring module in an embodiment of the invention.

Referring to FIG. 4, the configuring module 31 includes a webpage configuring module 311 configured to configure the subject name page for extracting a subject name, to configure the list page for extracting a subject chapter/section directory or a subject chapter/section, and to configure the content page for extracting subject contents.

Further referring to FIG. 4, the configuring module 31 further includes a queue configuring module 312 configured to configure the network link addresses of the network data to be collected into the queues of the corresponding types. The queue allocating module 312 further includes: a first allocating unit 3131 configured to allocate a link address of the type of subject name page to a subject name page queue; a second allocating unit 3122 configured to allocate a link address of the type of list page to a list page queue; and a third allocating unit 3123 configured to allocate a link address of the type of content page to a content page queue.

Figure 5:
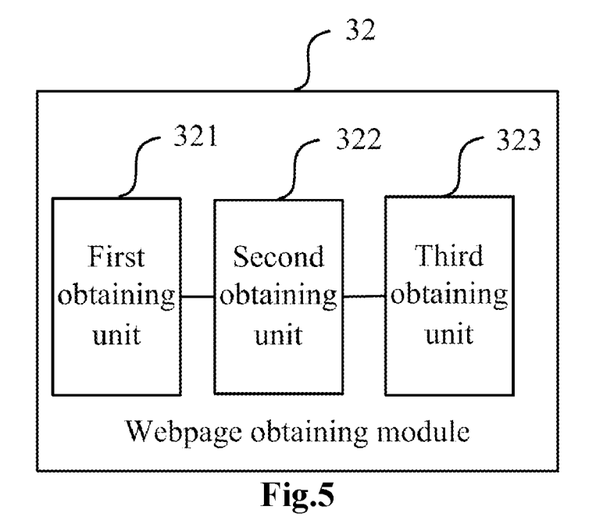
FIG. 5 is an architectural diagram of a webpage obtaining module in an embodiment of the invention.

In this embodiment, the webpage obtaining module 32 includes: a first obtaining unit 321 configured to obtain a webpage source code corresponding to the link address of the subject name page from the subject name page queue; a second obtaining unit 322 configured to obtain a webpage source code corresponding to the link address of the list page from the list page queue; and a third obtaining unit 323 configured to obtain a webpage source code corresponding to the link address of the content page from the content page queue. Reference is made to FIG. 5.

Figure 6:
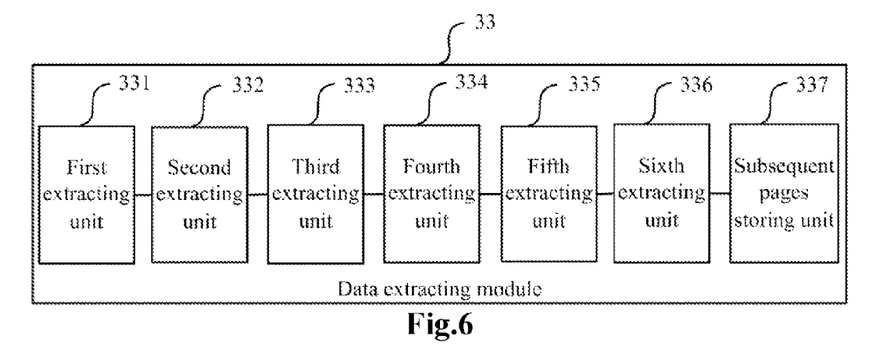
FIG. 6 is an architectural diagram of a data extracting module in an embodiment of the invention.

In this embodiment, the data extracting module 33 further includes: a first extracting unit 331 configured to extract the name of a subject and a URL corresponding to the name and to mark and then send to the second allocating unit 3122 a collection depth value of the URL corresponding to the name as a second threshold when a collection depth value of a URL corresponding to a webpage source code is a first threshold; a second extracting unit 332 configured to extract the name of the subject and the URL corresponding to the name and to mark and then send to the second allocating unit 3122 the collection depth value of the URL corresponding to the name as a third threshold when the collection depth value of the URL corresponding to the webpage source code is the second threshold; a third extracting unit 333 configured to extract a chapter/section directory of the subject and a URL of the chapter/section directory and to mark and then send to the second allocating unit 3122 a collection depth value of the URL of the chapter/section directory as the third threshold when the collection depth value of the URL corresponding to the webpage source code is the second threshold; a fourth extracting unit 334 configured to determine there is an upper URL for the URL corresponding to the webpage source code, and when a determination result is yes, to extract a chapter/section title of the subject and a URL of a chapter/section corresponding to the chapter/section title and to send the URL of the chapter/section to the third allocating unit 3123; or when the determination result is no, to extract the name and the chapter/section title of the subject and the URL of the chapter/section corresponding to the chapter/section title and to send the URL of the chapter/section to the third allocating unit 3123; a fifth extracting unit 335 configured to extract the chapter/section title of the subject and text contents of the chapter/section from the webpage source code and to extract an chapter/section ID of the chapter/section corresponding to the chapter/section title from the webpage source code; a paging determining unit 336 is configured to determine whether the text contents of the chapter/section are paged, where when the text contents of the chapter/section are paged, the fifth extracting unit 335 is further configured to extract a link address of a next page and also make the page number of a current page and the page number of the next page, and to send the page number of the next page to the third allocating unit 3123; and a subsequent page storing unit 337 configured to store the contents of the subsequent page with a link to the first page of the text contents of the chapter/section being a unique key, and to give an end flag upon collection of the last page. Reference is made to FIG. 6.

Figure 7:
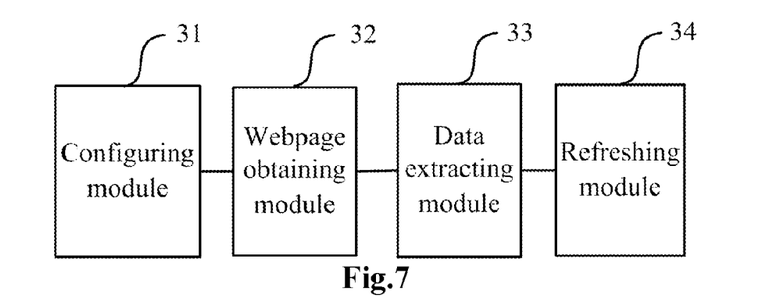
FIG. 7 is an architectural diagram of a collecting system in a second embodiment of the invention.

In a second embodiment, a difference thereof from the first embodiment is that the system further includes a refreshing module 34 configured to preset refresh intervals according to the frequencies at which the network documents, published on the website, related respectively to the M subjects are updated and to refresh the webpage link addresses of the network data to be collected at the refresh intervals. Reference is made to FIG. 7 for this embodiment.

Figure 8:
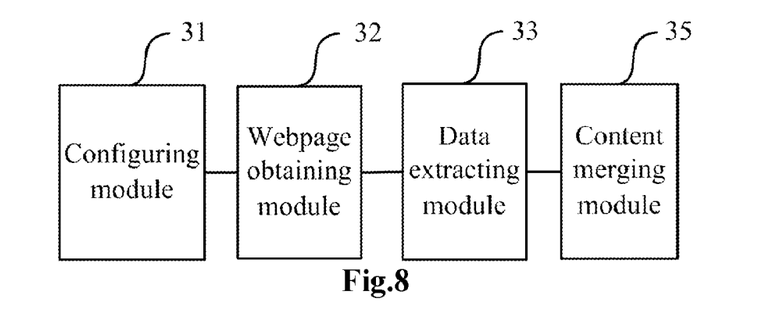
FIG. 8 is an architectural diagram of a collecting system in a third embodiment of the invention.

In a third embodiment, a difference thereof from the first and second embodiments is that the system further includes a content merging module 35 configured to merge the extracted text contents of all the subsequent pages together and to output them in connection with the chapter/section title. Reference is made to FIG. 8 for this embodiment.

In the embodiment, collection can also be performed in combination with the refreshing module in the second embodiment, and a detailed description of the system used in this combination will be omitted here for conciseness of the description.

Figure 9:
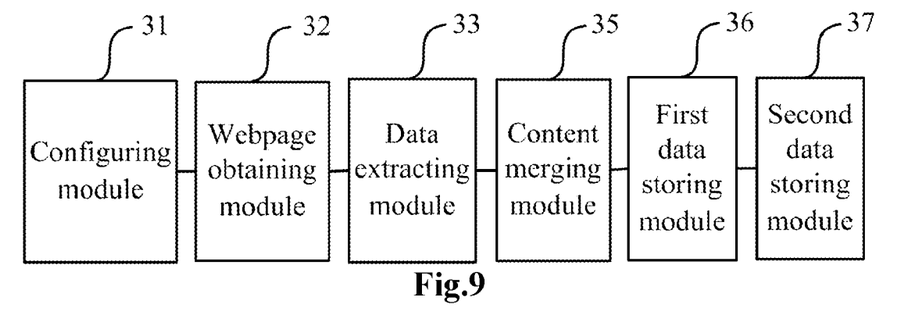
FIG. 9 is an architectural diagram of a collecting system in a fourth embodiment of the invention.

In a fourth embodiment, a difference thereof from the first, second and third systems is that the system further includes a first data storing module 36 configured to upload the website, the name of the subject, the chapter/section title of the subject, the chapter/section ID and the text contents of the chapter/section into a database; and a second data storing module 37 configured to select the database and upload the website, the name of the subject, the chapter/section title of the subject, the chapter/section ID and a storage path to the text contents of the chapter/section when a significant space of the database is occupied by the text contents of the chapter/section, where the storage path to the text contents of the chapter/section is a path to the text contents of the chapter/section stored in a file server in the form of an attachment. Reference is made to FIG. 9 for this embodiment.

In this embodiment, collection can also be performed in combination with the refreshing module in the second embodiment, and a detailed description of the system used in this combination will be omitted here for conciseness of the description.

The systems in the foregoing first, second, third and fourth embodiments can be implemented as described in the method of collecting network data and the various variants thereof A detailed description thereof will be omitted here for conciseness of the description.

In an embodiment of the invention, a system for collecting network data collects network data, and the system obtains a link address of the network data, configures the type of the link address and puts the link address into a corresponding queue according to the type of the link address; and obtains a source code corresponding to the link address from the queue and extracts information of the network data according to information about a corresponding URL in the source code and a collection depth value of the URL, thereby achieving the technical effect of real-time collection of the network data. Furthermore the content merging module can be further configured to merge network documents belonging to the same subject to thereby achieve the effect of convenient, rapid and centralized browsing of the network data together with real-time collection thereof.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of collecting network data, applicable to collection of data of network documents, published on a website, related respectively to M subjects, wherein M is a positive integer, the method comprising:
    configuring webpage link addresses, of network data to be collected, into queues of corresponding types according to types corresponding to the webpage link addresses of the network data to be collected, wherein the webpage link addresses of the network data to be collected are link addresses of webpages where the data of the network documents related respectively to the M subjects are located;
    obtaining webpage source codes corresponding to the webpage link addresses, of the network data to be collected, in the queues of the corresponding types; and
    extracting the data of the network documents corresponding to Uniform Resource Locators (URLs) corresponding to the webpage source codes according to URL information and collection depth values of the URLs.

2. The method according to claim 1, further comprising:
    presetting refresh intervals according to frequencies at which the network documents, published on the website, related respectively to the M subjects are updated; and
    refreshing the webpage link addresses of the network data to be collected at the refresh intervals.

3. The method according to claim 1, wherein each of the M subjects relates to a network literature, and the method further comprises:
    configuring a collection depth value of a URL according to structure of the network literature as:

$$N_{Deep} = \begin{cases} \text{A first threshold representing a contribution in the structure} \\ \quad \text{of "Name} \rightarrow \text{Volume} \rightarrow \text{Chapter} \rightarrow \text{Contents"} \\ \text{A second threshold representing a contribution in the structure} \\ \quad \text{of "Name} \rightarrow \text{Chapter} \rightarrow \text{Contents"} \\ \text{A third threshold representing a contribution in the structure} \\ \quad \text{of "Chapter} \rightarrow \text{Contents"} \end{cases}.$$

4. The method according to claim 1, wherein the types corresponding to the webpage link addresses of the network data to be collected include a subject name page, a list page and a content page; and
    the subject name page is configured for extracting a name of a subject, the list page is configured for extracting a chapter/section directory of a subject or a chapter/section of a subject, and the content page is configured for extracting contents of a subject.

5. The method according to claim 4, wherein the configuring the webpage link addresses, of the network data to be collected, into the queues of the corresponding types further comprises:
    allocating a link address of a type of the subject name page to a subject name page queue;
    allocating a link address of a type of the list page to a list page queue; and
    allocating a link address of a type of the content page to a content page queue.

6. The method according to claim 5, wherein the obtaining the webpage source codes corresponding to the webpage link addresses, of the network data to be collected, in the queues of the corresponding types further comprises:
    obtaining a webpage source code corresponding to the link address of the subject name page from the subject name page queue.

7. The method according to claim 6, wherein the extracting the data of the network documents corresponding to the URLs corresponding to the webpage source codes according to the URL information and the collection depth values of the URLs further comprises:
    if a collection depth value is a first threshold, extracting the name of the subject and a URL corresponding to the name and marking and then adding to the list page queue the collection depth value of the URL corresponding to the name as a second threshold; and
    if the collection depth value is the second threshold, extracting the name of the subject and the URL corresponding to the name and marking and then adding to the list page queue the collection depth value of the URL corresponding to the name as a third threshold.

8. The method according to claim 5, wherein the obtaining the webpage source codes corresponding to the webpage link addresses, of the network data to be collected, in the queues of the corresponding types further comprises:
    obtaining a webpage source code corresponding to the link address of the list page from the list page queue.

9. The method according to claim 8, wherein the extracting the data of the network documents corresponding to the URLs corresponding to the webpage source codes according to the URL information and the collection depth values of the URLs further comprises:
    if a collection depth value is a second threshold, extracting the chapter/section directory of the subject and a URL corresponding to the chapter/section directory and marking and then adding to the list page queue the collection depth value of the URL corresponding to the chapter/section as a third threshold; and
    if the collection depth value is the third threshold, determining whether there is an upper URL for the URL corresponding to the webpage source code:
    if so, extracting the chapter/section title of the subject and the URL of the chapter/section corresponding to the chapter/section title, and adding the URL of the chapter/section to the content page queue; or
    if not, extracting the name of the subject, the chapter/section title of the subject and the URL of the chapter/section corresponding to the chapter/section title, and adding the URL of the chapter/section to the content page queue.

10. The method according to claim 5, wherein the obtaining the webpage source codes corresponding to the webpage link addresses, of the network data to be collected, in the queues of the corresponding types further comprises:
    obtaining a webpage source code corresponding to the link address of the content page from the content page queue.

11. The method according to claim 10, wherein the extracting the data of the network documents corresponding to the URLs corresponding to the webpage source codes according to the URL information and the collection depth values of the URLs further comprises:
    extracting the chapter/section title of the subject and text contents of the chapter/section from the webpage source code, and extracting an chapter/section ID of the chapter/section corresponding to the chapter/section title from a URL corresponding to the webpage source code.

12. The method according to claim 11, further comprising:
when the text contents of the chapter/section are paged, extracting the link address of a next page and further marking a page number of current page and the page number of the next page, and sending the page number of the next page to the content page queue waiting for collection.

13. The method according to claim 12, further comprising:
storing the contents of subsequent page with a link to first page of the text contents of the chapter/section being a unique key, and giving an end flag upon collection of last page.

14. The method according to claim 13, further comprising:
merging the extracted text contents of all subsequent pages together and outputting them in connection with the chapter/section title.

15. A system for collecting data, applicable to collection of data of network documents, published on a website, related respectively to M subjects, wherein M is a positive integer, the system comprising:
at least one processor; and
a memory communicably connected with the at least one processor for storing instructions executable by the at least one processor, wherein execution of the instructions by the at least one processor causes the at least one processor:
to configure webpage link addresses, of network data to be collected, into queues of corresponding types according to types corresponding to the webpage link addresses of the network data to be collected, wherein the webpage link addresses of the network data to be collected are link addresses of webpages where the data of the network documents related respectively to the M subjects are located;
to obtain webpage source codes corresponding to the webpage link addresses, of the network data to be collected, in the queues of the corresponding types; and
to extract the data of the network documents corresponding to Uniform Resource Locators (URLs) corresponding to the webpage source codes according to URL information and collection depth values of the URLs.

16. The system according to claim 15, execution of the instructions by the at least one processor causes the at least one processor: to preset refresh intervals according to frequencies at which the network documents, published on the website, related respectively to the M subjects are updated and to refresh the webpage link addresses of the network data to be collected at the refresh intervals.

17. The system according to claim 15, wherein the types corresponding to the webpage link addresses of the network data to be collected include a subject name page, a list page and a content page, and execution of the instructions by the at least one processor causes the at least one processor: to configure the subject name page for extracting a name of a subject, to configure the list page for extracting a chapter/section directory of a subject or a chapter/section of a subject, and to configure the content page for extracting contents of a subject.

18. The system according to claim 15, wherein execution of the instructions by the at least one processor further causes the at least one processor: to configure the network link addresses of the network data to be collected into the queues of the corresponding types, and execution of the instructions by the at least one processor causes the at least one processor:
to allocate a link address of a type of the subject name page to a subject name page queue;
to allocate a link address of a type of the list page to a list page queue; and
to allocate a link address of a type of the content page to a content page queue.

\* \* \* \* \*